Jan. 29, 1963
R. F. GARVER
3,075,570
TIRE BUILDING MACHINE
Filed Sept. 22, 1959
2 Sheets-Sheet 1
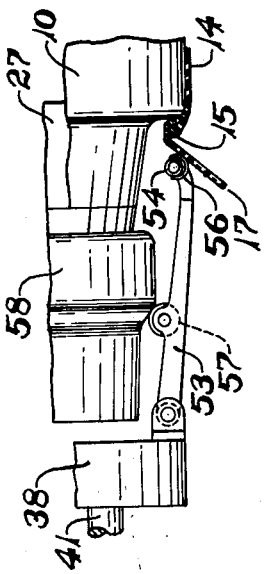
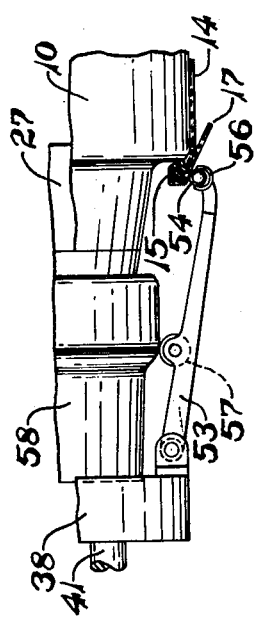
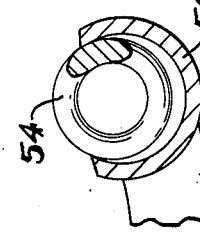
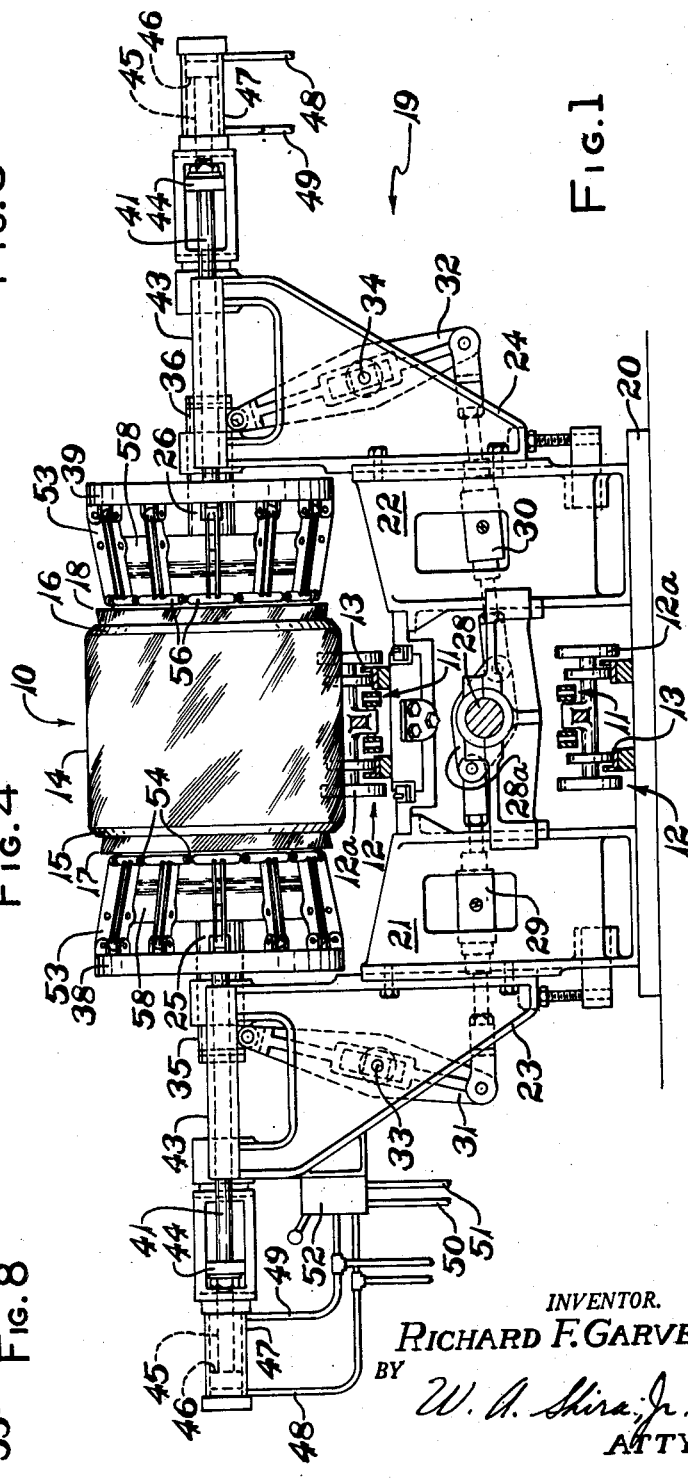
INVENTOR.
RICHARD F. GARVER
BY
W. A. Shira, Jr.
ATTY.

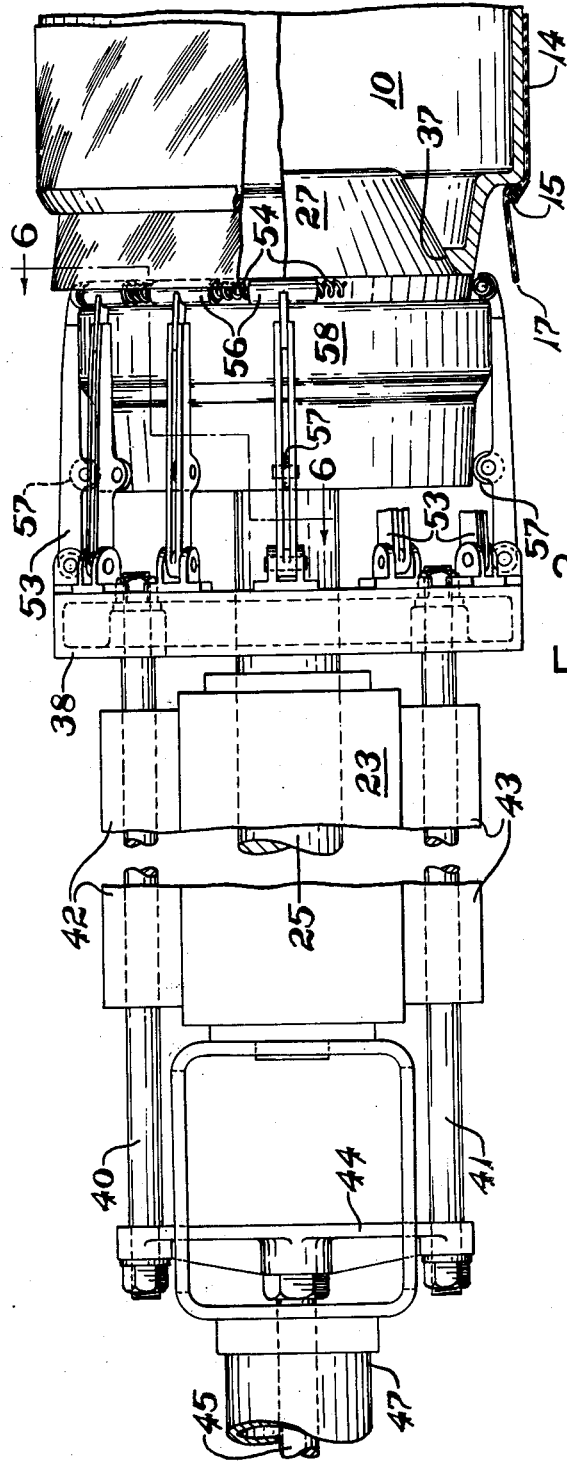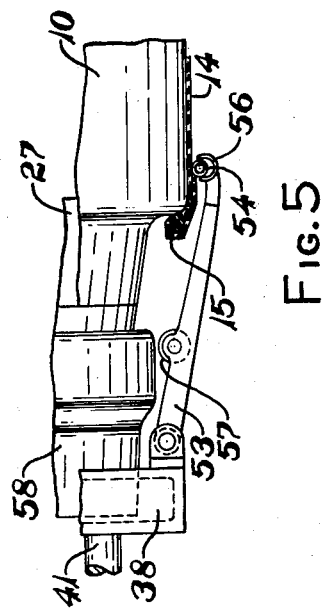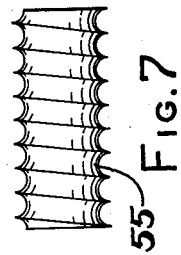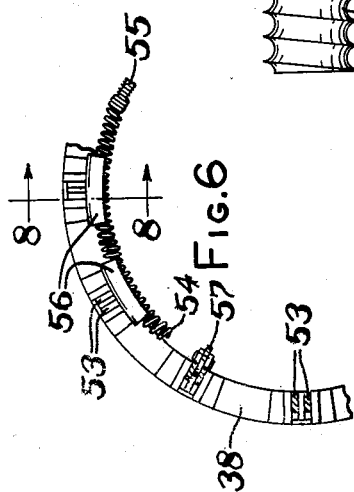
INVENTOR.
RICHARD F. GARVER
BY
ATTY.

United States Patent Office 3,075,570
Patented Jan. 29, 1963

3,075,570
TIRE BUILDING MACHINE
Richard F. Garver, Akron, Ohio, assignor to The B. F. Goodrich Company, New York, N.Y., a corporation of New York
Filed Sept. 22, 1959, Ser. No. 841,637
4 Claims. (Cl. 156—400)

This invention relates to a machine for building inflatable tires and, more particularly, to an improved apparatus for turning the edges of the tire carcass ply stock over the bead cores and stitching down the turned edges.

Inflatable tires, particularly those types produced in large quantities for passenger and other vehicle use, are customarily constructed in flat-band configuration on collapsible cylindrical drums and, after removal from the drums, are shaped into the characteristic toroidal shape following which they are cured or vulcanized. In such drum-building of tires, plies of cord reinforced elastomeric sheets are sequentially built up on the surface of the drum. These plies are of a width greater than that of the cylindrical surface of the drum whereby the overhanging edges of the innermost plies may be turned radially inwardly relative to the outer surface of the drum. Bead cores are then placed over the turned in edges of ply stock adjacent each end of the drum and the edges of the ply stock must then be lifted, folded over the bead cores and stitched down. These operations have, heretofore, either necessitated sequential use of separate tools or the provision of a complicated mechanism, when attempts were made to combine the operations. Moreover, conventional tools for performing these operations effect the ply turn-up and stitching sequentialy about the periphery of the tire carcass frequently resulting in incomplete or non-uniform adhesion of the turned edges to the adjacent regions of the tire carcass.

Attempts have been made, heretofore, to effect the ply turn-up and stitching simultaneously about the entire circumference of the tire carcass. Successful mechanisms of that type have, however, been exceedingly cumbersome and complex and are adaptable only to single station building machines. They have not been of a nature permitting their use on multiple station, production line type of tire building machines of the type in which the tire building drum is transported from station to station for sequential operations thereon.

The principal object of this invention, therefore, is to provide an improved and simplified apparatus which will perform, in a single operation, the lifting, folding and stitching down of the edges of the tire carcass ply stock about tire bead cores, the apparatus being so constructed and arranged that the entire circumference of each edge of the ply stock is simultaneously so lifted, folded and stitched down with the result that the surface over and adjacent to the tire beads is smooth and appreciably free from objectionable wrinkles and folds.

Another object of this invention is to provide an improved apparatus for lifting, folding and stitching down the edges of the tire carcass ply stock on each end of a tire building drum simultaneously about the entire circumference of the tire, wherein said apparatus is so constructed that it can be incorporated in a single station tire building machine or in one station of a multiple station automatic tire building machine.

A further object of the invention is to provide an improved apparatus as defined in the preceding paragraph wherein the novel ply edge lifting, turning and stitching mechanism is mounted coaxially with a means to center and removably support a tire building drum.

The invention further resides in certain novel features of the construction and in the combination and arrangement of the apparatus parts, and further objects and advantages of the invention will be apparent from the following description of the presently preferred embodiment described with reference to the accompanying drawings, forming a part of this application, in which:

FIG. 1 is a side elevational view of a single station of a multiple station tire building machine embodying the ply turn-up and stitching mechanism of this invention;

FIG. 2 is an enlarged, fragmentary top view of one end of FIG. 1;

FIG. 3 is an enlarged view of a portion of the mechanism more clearly showing the operation thereof in effecting the lifting of the ply stock edge;

FIG. 4 is a view similar to FIG. 3 but showing the operation of the mechanism in folding the ply stock edge about the bead core;

FIG. 5 is a view similar to FIGS. 3 and 4 but showing the stitching operation of the mechanism;

FIG. 6 is a fragmentary, partially sectional view taken on line 6—6 of FIG. 2 showing the helical coil spring for effecting ply turn-up and stitching together with its supporting and actuating arms, the connector for the ends of the spring also being shown;

FIG. 7 is a side view to a larger scale of the threaded connector for the ends of the helical coil spring; and FIG. 8 is a fragmentary transverse-sectional view taken along line 8—8 of FIG. 6, and to a larger scale, showing the retention of the helical coil spring within the segmental annular shell supports.

The presently preferred form of the apparatus embodying this invention is illustrated in the drawings as incorporated in one station of a multiple station automatic tire building machine which may be of the type disclosed in U.S. Patent 2,319,643. In a machine of this type, collapsible tire building drums, such as 10, have a tire built thereon in flat band form sequentially at successive stations between which the drums are transported by a suitable conveyor 11 as is more fully described in the above-mentioned patent. The conveyor 11 comprises a plurality of chain interconnected rolling carriages 12 running on guide rails 13. The carriages 12 each include a plurality of discs 12a so constructed as to removably support one each of the series of tire building drums 10. In operation of such a machine, the conveyor 12 is intermittently actuated to position the drums 10 sequentially at each of the stations and, while the conveyor is stationary, tire building operations are performed on the drums. Thus, prior to the ply turn-up station illustrated in FIG. 1 of the accompanying drawings, each tire building drum 10 is sequentially provided with layers of ply stock 14, over which bead cores 15, 16, which may be enclosed in flipper strips as shown, are placed near the edges 17, 18 of the ply stock adjacent the ends of the drum 10.

The ply turn-up station 19 illustrated in FIG. 1 includes a suitable frame comprising a base plate 20 and spaced vertical supports 21, 22 to which, respectively, are attached vertically extending spindle supports 23, 24. The upper portions of the spindle supports are bifurcated and are provided with spaced bearings in which opposed spindles 25, 26 are journalled for axial movement. The inner end of each spindle is provided with a conical chuck 27 for centering and supporting a tire building drum 10.

The conical chucks 27 are moved to and from engagement with a drum 10 by partial rotation of a rock shaft 28, operatively connected to the spindles 25 and 26. This connection includes a crank member 28a connected to shaft 28 and to links 29 and 30 which, in turn, are connected to the lower ends of levers 31 and 32 respectively.

The levers 31 and 32 are pivoted on the supports 23 and 24 at points 33 and 34, respectively, and the upper ends of the levers 31 and 32 are forked and engage collars 35, 36 attached to the opposed spindles 25, 26.

The construction is such that counterclockwise movement of shaft 28 moves the conical chucks 27 inward to the position shown in FIG. 2 causing them to engage matching concave surfaces 37 on the ends of the drum 10. This lifts the drum 10 until it just clears the rolling carriage 12, at which time the drum is centered and gripped securely for the ply turn-up operation.

In accordance with this invention, the apparatus at the illustrated station of the tire machine is so constructed that it effects simultaneous turn-up of the entire edges 17, 18 of the ply stock 14 overhanging the cylindrical surface of the tire building drum 10. This apparatus comprises a pair of annular, expansible and rollable members supported at the said station in a manner such that one member is adjacent each end of a tire building drum positioned at that station and is operative upon axial movement of the members to effect the ply turn-up and stitching operations. This is effected rapidly and without need of drum rotation by a mechanism which is easily incorporated into an existing tire building machine.

The illustrated embodiment of the ply turn-up and stitching apparatus comprises a pair of axially movable support members 38, 39, one disposed adjacent each chuck 27, in axial alignment with the spindles 25, 26. The members 38, 39 are each supported at the inner ends of a pair of spaced horizontal guide shafts 40, 41, see FIG. 2, which are axially slidable in bearing sleeves 42 and 43 carried by each spindle support on either side of the adjacent spindle such as 25. The outer ends of each pair of shafts 40 and 41 are connected to a cross head 44 to which is also attached a piston rod 45 provided with a piston 46 within a cylinder 47. Each cylinder 47 is provided adjacent either end with conduits 48 and 49 through which fluid pressure is selectively applied to effect axial movement of the members 38 and 39 under control of a suitable valve means. As here shown, the conduits 48 and 49 are selectively connected with pressure supply and exhaust lines 50 and 51 by actuation of a manually operable valve 52. It will be readily evident, however, that the valve 52 may be automatically operated and its operation controlled in timed sequence with the operation of other portions of the tire building machine.

To each of the axially movable supports 38 and 39 are attached a plurality of elongated arms 53 in an annular configuration and extending from each support 38, 39 in a generally parallel relationship. The free ends of the arms 53 are radially movable and support an annularly shaped expansible and rollable member, which is preferably a helical coil spring 54, there being one such spring adjacent each end of the tire building drum 10. Each coil spring 54 is preferably of continuous length to form a complete annulus of proper size with the ends of the spring joined by a threaded connector 55. The springs are retained on the arms 53 by segments of annular shells 56 carried by the arms and which partially enclose the spring with a radially inner portion of the latter projecting from the openings of the shells, see FIG. 8. The outside diameter of each spring 54 is slightly less than the inside diameter of the annular shell segments 56, thus allowing the spring 54 to be freely rotatable. The arms 53 are here shown as rigid and pivoted to the support members 38 or 39 for radial movement of the outer ends of the arms and the springs 54 carried thereby. This radial movement is correlated with and effected during axial movement of the springs to and from cooperation with the drum 10 by cam means coaxial with the drum supporting chucks 27. For this purpose each arm 53 is provided with a rotatable cam follower 57 which rides upon an axially elongated annular cam 58, there being one such cam connected to and extending axially outward from each chuck 27. The cam followers 57 are maintained in contact with the cam surfaces by the constricting force of the springs 54 during initial axial movement of the assembly with the cam followers being lifted from engagement with the cams as the springs roll over the turned edges of ply stock, see FIG. 5.

In operation of the apparatus, a tire building drum, previously provided with ply stock 14 and bead cores 15, 16, is conveyed to the station 19 by the conveyor 11. The shaft 28 is then rocked, as explained above, causing the drum to be lifted from the conveyor and supported by the chucks 27, the positions of the parts of the apparatus then being as shown in FIGS. 1 and 2 of the drawings.

The control valve 52 is now actuated to allow the fluid under pressure in pressure line 50 to be transmitted through pressure conduits 48 to the two cylinders 47 thereby exerting pressure on pistons 46 causing them to be moved inwardly, conduits 49 being vented to the fluid reservoir not shown. The inward movement of pistons 46 operates through the piston rods 45, cross-heads 44, and guide shafts 40 and 41 to axially move the supports 38 and 39 and the arms 53 towards the drum. During the initial portion of this movement the springs 54 are carried beneath the outwardly extending edges 17 and 18 of the ply stock 14. As this axial movement continues the cam followers 57 of the arms 53 rise over the inclined portion of the profile of the annular cams 58 forcing the free ends of the arms 53, and the springs 54 supported thereby, to move from their retracted position beneath the edges of the ply stock, as seen in FIG. 2, radially outward, as well as axially inward, see FIG. 3. This causes the segments of the annular shells 56 to lift the entire periphery of each edge 17 and 18 of the ply stock simultaneously. During this edge lifting, the ply stock tends to drag over the annular shells 56 as seen in FIG. 3 so that the latter effect a tensioning of the ply stock 14 pulling it tightly about the bead cores 15 and 16. As the axial movement of the arms and springs continues, the edges of the ply stock begin to fold over the outer surface of the bead cores and the springs 54 now engage the ply stock as seen in FIG. 4. The final portion of the movement inwardly of the arms and springs cause the latter to smooth and stitch down the edges 17 and 18 of the ply stock to the adjacent ply stock surface, see FIG. 5.

When the folding and stitching operations are thus completed, the control valve 52 is actuated to reverse the flow of fluid pressure in conduits 48 and 49, conduit 49 then being pressurized and conduit 48 being vented to the fluid reservoir. This reverses the travel of pistons 46 thereby moving the arms 53 and the springs 54 back to their retracted positions. During this return movement of the springs 54 they perform an additional stitching operation by once again rolling over the edges of the ply stock.

After the arms 53 and springs 54 having returned to their initial positions the rock shaft 28 is rotated clockwise to retract chucks 27 from the drum 10 allowing the drum to rest once more in the conveyor carriage 12 for conveyance to subsequent tire building stations, and another drum 10 is located at the turn-up station 19 whereupon the above-described cycle of operations is repeated.

The invention has been specifically described with respect to use in a multiple station tire building machine. It will be apparent, however, that the invention is not limited to use in building tires in a multiple station machine, but may also be used to advantage in a single stage tire building machine. Other adaptations and modifications of the apparatus will readily occur to those skilled in the art to which it pertains and hence the invention is not limited to the details of construction herein illustrated and described except as required by the spirit and scope of the appended claims.

Having thus described the invention, I claim:

1. In a tire building machine, a tire building drum having axially disposed support receiving surfaces adjacent either end thereof, a pair of drum supporting members axially movable to and from said drum and cooperating with said surfaces to center and support the drum, a tire ply stock turn-up means supported for axial movement adjacent each end of said drum externally thereof, said turn-up means each including an annularly shaped expansible and rollable member, a plurality of axially extending arms supporting each of said rollable members coaxially with said drum adjacent an end thereof, means for simultaneously axially moving all of said arms sequentially toward and from said drum, and annular cam means stationarily mounted on each of said drum supporting members and cooperating with said arms in the axial movement of the latter to interpose thereon a predetermined radial movement thereby causing said rollable members to effect turn-up and smoothing of the edge of ply stock on said drum.

2. A tire building machine as defined in claim 1, wherein the said support receiving surfaces of said drum are the peripheries of centrally located support receiving apertures of circular cross section at either end of the drum and the drum supporting members are each provided with conical surfaces interengageable in said aperture peripheries to center and support the drum.

3. In a tire building machine of the multiple station type wherein tire building drums are conveyed from station to station for successive operations of tire building with each tire building drum having a cylindrical surface that is sequentially provided with an annulus of tire carcass-forming ply stock having the edges of that stock extending beyond said surface and beyond annular bead cores placed on said stock after which the stock edges are folded over the bead cores adjacent the edges, the improvement which comprises apparatus for effecting said stock edge folding, the said apparatus comprising a pair of spaced drum support means mounted at one station of the machine for axial movement towards and from the ends of a drum at that station, said support means each including a conical surface engageable in an opening at an end of the drum to center and support the latter, a member coaxial with each of said support means and axially movable relative thereto, a plurality of elongated arms pivotally mounted on each of said members in an annular configuration and extending therefrom in a generally parallel relationship axially towards said drum, an annularly disposed helical spring supported by the said arms of each member adjacent the proximate end of said drum, an annular cam coaxial with and stationarily affixed to each of said support means respectively, means to move said support means to and from supporting engagement with said drum and to dispose said cams between said members and drum, means to move said members and arms relative to said support means, and cam followers on said arms cooperating with the adjacent cam when said drum is engaged by the said surfaces of the support means and said members are moved towards said drum to cause the said springs to move from retracted positions beneath the said extending ends of the ply stock annulus radially outward and axially toward each other thereby folding said ply stock edges over said bead cores and smoothing the said ply stock about said bead cores and into contact with the portions of the ply stock axially inwardly of the bead cores.

4. A tire building machine as defined in claim 3 wherein the free ends of said arms are each provided with a segment of an annular shell having a portion of the sidewall removed with the said springs supported by those arms freely rotatable in said shells and having a radially inner portion of the surface of the spring extending therefrom.

References Cited in the file of this patent

UNITED STATES PATENTS

| | | |
|---|---|---|
| 2,319,643 | Sternad | May 18, 1943 |
| 2,409,974 | Breth | Oct. 22, 1946 |
| 2,614,952 | Kraft | Oct. 21, 1952 |
| 2,743,760 | Beckadolph | May 1, 1956 |
| 2,838,091 | Kraft | June 10, 1958 |